May 20, 1952     B. C. KAY ET AL     2,597,737
VARIABLE DEPTH REMOTE-CONTROLLED FISHING FLOAT
Filed April 3, 1950
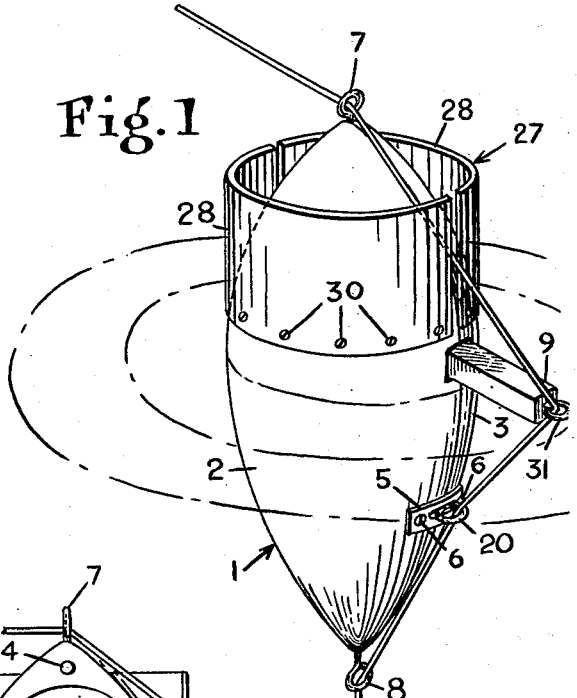
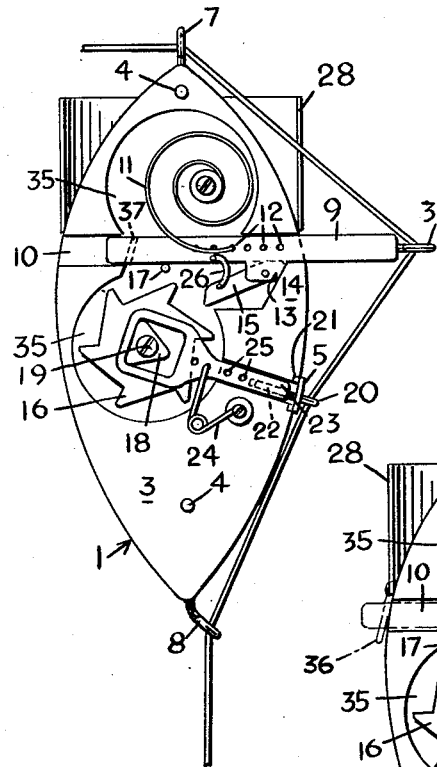
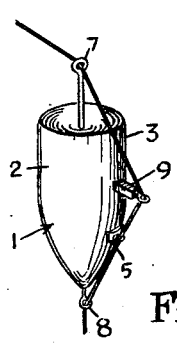
INVENTORS:
Billy C. Kay and
Ira B. Hagar,
BY Ralph F. Staubly
ATTORNEY Patented May 20, 1952

2,597,737

UNITED STATES PATENT OFFICE 2,597,737

VARIABLE-DEPTH REMOTE-CONTROLLED FISHING FLOAT

Billy C. Kay and Ira B. Hagar, Hermitage, Tenn.

Application April 3, 1950, Serial No. 153,678

5 Claims. (Cl. 43—44.88)

1

This invention relates to a variable-depth remote-controlled fishing-float.

Our invention is particularly useful for fishing in water where the level at which the bait is held should, for best results, be raised or lowered frequently.

As is well known to skilled fishermen, the depth at which the bait is held is of the utmost importance. Depending upon the variety of fish sought and/or the relative depth of the water, it is desirable to hold the bait at a predetermined distance either from the surface or from the bottom. These distances will vary from time to time due to drift or other factors. With conventional fishing floats and tackle, such changes require pulling in the float, readjusting the tackle and recasting, a bothersome and time-consuming operation, as well as one which frequently frightens away whatever fish may be present.

It has heretofore been proposed to design floats which would be close to the sinker and/or bait during casting (so as to minimize tangling of the line) and from which the bait and sinker would drop a predetermined distance from the surface. It has also been proposed (Walberg, Pat. No. 2,052,262, August 25, 1936) to provide a float from which the hook and sinker would freely drop to a "played out" depth, or until bottom is reached if a depth-sounding operation is desired, and then be locked in this, or in a slightly elevated position (produced by rewinding the line) by a laborious series of lateral "whippings" of the line to cause a pair of jaws to seize the line to prevent its movement thereafter until the float is pulled in and set for another operation.

Objects of invention

It is an object of our invention to provide a remote-controlled float which, in response to a single relatively quick pull or tug upon the fishing line by the fisherman, will either grip or release the line for either anchorage (or restrained movement), or free movement relative to the float.

It is another object to provide such an automatic float in which the same type of pulls will alternately grip and release the line, or vice versa.

It is a further object of the invention to provide a remote-controlled float which is simple in construction, inexpensive to manufacture, and yet durable and effective in operation.

It is a still further object of our invention to provide such an automatic float with an adjustable line-gripping means whereby lines of different diameters may be used and/or whereby the amount of the gripping or braking may be varied.

2

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a perspective view showing the float half-submerged in clear water,

Fig. 2 is an elevational view of the mechanism-carrying half of the float with the near half removed, Fig. 3 is a view like that of Fig. 2 but showing the parts in the second of the two operative positions, and Fig. 4 is a modified form having a dished top forming a water-scoop.

Detailed description

The float, in the specific form disclosed, comprises a body 1, symmetrical about a longitudinal vertical axis. The body is formed of a buoyant material, such as wood, foam plastic, cork, or hollow metal, and is divided longitudinally into two sections 2 and 3, one or both of which may be hollowed out to form spaces to receive the mechanical movements. Figs. 2 and 3 show the mechanism lying in depressions in the half-section 3, the near half 2 being removed.ABS 4 enter close-fitting bores in the removed section to hold the two parts assembled, assisted by the plate 5 held across the joint by screws 6. One or both of the half sections is provided with the depressions in which the internal mechanism lies. The mechanism comprises top and bottom eyes 7 and 8 for guiding the line to and away from the float. Located centrally of the body is a plunger 9 guided in channel 10 and biased outwardly by spring 11 to the full-line positions shown in the figures. The movable end of this spring is insertable selectively into holes 12 in the plunger to vary the spring force, as desired. Abutments 13 and 14 limit outward movement of the plunger. In the outer end of the plunger is another eye 31 through which the line passes, as shown. From this construction it is apparent that a sudden or quick pull upon the line will force the plunger inwardly, causing pawl 15 to engage toothed wheel 16 to rotate it ⅛ turn, the plunger being stopped by pin 17. The mechanism can be locked out of action (with the line either free or locked) by inserting a pin 36 in bore 37 in plunger 9, as shown in Fig. 3.

Rigidly attached to wheel 16 is a triangular cam 18, both parts rotating freely about the pin 19. The line-gripping mechanism consists of a line-receiving eye 20 passing through a slot in the plate 5, these two parts forming the gripping jaws. Beneath the plate lies a resilient gasket 21, making the plate adjustable by tightening or loosening screws 6 to vary the braking action or to accommodate lines of different diameters. A further adjustment is possible by screwing the stem of eye 20 deeper in the bore 22 in connecting rod 23. Rod 23 is biased to move outwardly by spring 24, whose free end is adjustably insertable in holes 25. The inner end of rod 23 is provided with an opening to receive the triangular cam 18 by which the push rod is positively operated to clamp the line and is released to free the line.

The pivoted end of pawl 15 is shaped so that its engagement with the abutment will force the tooth-engaging end downwardly. This action may be made more certain by the use of a spring 26.

As can be seen in the showing of Figs. 2 and 3, the disclosed device includes an inherently force-amplifying mechanism. The relatively large movements of the fishing line and the plunger 9 between their full-line and broken-line positions in Fig. 3 (resulting from an operating tug upon said line) causes a one-sixth rotation of the wheel 16. This in turn moves cam 18 from its Fig. 2 position to its Fig. 3 position, and moves rod 23 and its line-clamping eye 20 a very short distance (which is approximately the diameter of the fishing line) thus multiplying the line-exerted force by a factor approximately equal to the ratio between the distances of movement of plunger 9 and eye 20.

The top of the float may be provided with a water-scooping cup 27 formed by a single cylindrical ring having a line-receiving slot in one edge, or the cup may be formed of two semi-cylindrical parts 28 so that the halves of the float can be separated without removing the cup therefrom. The cup may be attached in any desired manner to the float, as by screws 30. The cup increases the "drag" of the float so that it will not be too readily pulled through the water when the fisherman pulls the line to operate the mechanism. It should be noted that the volume of fluid in the housing is not altered by movements of the plunger, so that no dash-pot effect is produced to interfere with smooth operation.

*Mode of operation*

Before casting, the plunger 9 is operated either to clamp the float at the desired point along the line or to release the line so that the float will abut the sinker S or other stop means. After casting, the line is allowed to feed through the guides until the sinker has carried the bait to the desired depth or until the bottom is reached (if a sounding is desired). In the latter case, the line is then reeled in until the desired raising of the bait is produced. In both cases, when the bait is at the desired level, the operator gives a quick tug upon the line. Due to its resistance to movement through the water the float causes the line to force the plunger inwardly from the full-line position to the dotted-line position of Fig. 3. This operation moves the toothed-wheel, the cam and eye 20 from the non-clamping position of Fig. 2 to the line-clamping position of Fig. 3, locking the line, and thus holding the bait at the desired level.

If a change of level is desired (without reeling in and recasting) another tug on the line will rotate the wheel and cam another ⅙ turn to release the gripping action and permit either raising or lowering of the bait, whereupon another quick tug will again lock the float to the line at the desired point.

It is to be understood that the forms of our invention herein shown and described, are to be taken as preferred examples of the same, and that various changes relative to the shape, size, material and arrangement of parts may be resorted to without departing from the spirit of the invention, or the scope of the appended claims.

Having thus described our invention, we claim:

1. A fishing float, comprising: a buoyant body portion, guide means associated with said body portion for guiding a fishing line as it passes through the zone of the float in extending or moving from a control station to a bait zone, gripping means associated with said body portion and adapted to engage said line for selectively retarding the passage of said line past said float zone, operating means responsive to a single relatively quick pull upon said line from said control station for operating said retarding means to vary its retarding action, and mechanical advantage means interposed between said operating means and said gripping means whereby a slight force exerted by a pull on said line is amplified to many times its value in the resultant force exerted by said gripping means on said line.

2. A fishing float according to claim 1 and in which said body has water-scoop-forming portions of such shape and extent as to increase the drag or resistance to movement through the water in response to a pull from said control station.

3. A fishing float according to claim 1 and in which said gripping means includes a plate having screw holes through said plate, a resilient gasket between said plate and the float body and screws adjustably attaching said plate to the body with said resilient gasket clamped therebetween.

4. A fishing float according to claim 1 and in which said body portion is symmetrical about a longitudinal axis and is divided into two sections along a plane parallel to said axis, at least one of the surfaces of said body adjacent said plane being provided with well-like depressions to receive the mechanical movements of the mechanism for remotely controlling the line-movement-retarding means.

5. A fishing float according to claim 1 and in which said operating means includes a plunger having means thereon co-operating with said fishing line whereby tension thereon will move said plunger axially, spring means biasing said plunger against said line tension, stop means limiting the movement of said plunger, a stepped wheel engageable by said plunger for partial rotation thereby, a cam co-axially attached to said wheel for rotation therewith, a cam-follower embracing said cam, and said gripping means includes a line-embracing member operated by said cam-follower to grip said line or to release the same selectively.

BILLY C. KAY.
IRA B. HAGAR.

REFERENCES CITED

The following references are of record in the file of this patent:

UNITED STATES PATENTS

| Number | Name | Date |
|---|---|---|
| 2,153,869 | Jones | Apr. 11, 1939 |